US006724689B2

(12) United States Patent
Koenig

(10) Patent No.: US 6,724,689 B2
(45) Date of Patent: Apr. 20, 2004

(54) PERSONAL IDENTIFICATION METHOD AND APPARATUS USING ACOUSTIC RESONANCE ANALYSIS OF BODY PARTS

(76) Inventor: Philip Koenig, P.O. Box 980, Winchester, MA (US) 01890

( * ) Notice: Subject to any disclaimer, the term of this patent is extended or adjusted under 35 U.S.C. 154(b) by 0 days.

(21) Appl. No.: 10/094,292

(22) Filed: Mar. 8, 2002

(65) Prior Publication Data

US 2003/0169640 A1 Sep. 11, 2003

(51) Int. Cl.[7] .................................................. G06F 1/00
(52) U.S. Cl. ...................................................... 367/125
(58) Field of Search ................................. 367/125, 191; 181/126; 73/579; 600/437, 587; 382/115; 713/202

(56) References Cited

U.S. PATENT DOCUMENTS

| 3,648,240 | A |   | 3/1972  | Jacoby          |         |
|-----------|---|---|---------|-----------------|---------|
| 4,107,775 | A | * | 8/1978  | Ott ............ | 73/579  |
| 4,699,149 | A |   | 10/1987 | Rice            |         |
| 4,785,171 | A |   | 11/1988 | Dowling et al.  |         |
| 4,857,916 | A |   | 8/1989  | Bellin          |         |
| 4,932,776 | A |   | 6/1990  | Dowling et al.  |         |
| 4,946,276 | A |   | 8/1990  | Chilcott        |         |
| 5,062,296 | A |   | 11/1991 | Migliori        |         |
| 5,088,817 | A |   | 2/1992  | Igaki et al.    |         |
| 5,230,025 | A |   | 7/1993  | Fishbine et al. |         |
| 5,335,288 | A |   | 8/1994  | Faulkner        |         |
| 5,351,303 | A |   | 9/1994  | Willmore        |         |
| 5,606,130 | A |   | 2/1997  | Sinha et al.    |         |
| 5,787,187 | A | * | 7/1998  | Bouchard et al. | 382/115 |
| 5,793,881 | A |   | 8/1998  | Stiver          |         |
| 5,919,144 | A |   | 7/1999  | Bridger et al.  |         |
| 6,219,793 | B1| * | 4/2001  | Li et al. ..... | 713/202 |

FOREIGN PATENT DOCUMENTS

| WO | WO-9927489 | * | 6/1999 | ........... G06K/9/00 |

OTHER PUBLICATIONS

Schneider et al.;Ultrasonic Imaging Systems for Personal Identification; 2001; IEEE Ultrasonics Symposium; pp. 595–601.*

* cited by examiner

Primary Examiner—Daniel T. Pihulic

(57) ABSTRACT

An acoustic spectra personal identification system comprising acoustic signal generating means, acoustic transducer means and computer means including storage means, processor means and acoustic signal analysis means, whereby a data base may be generated and maintained that stores acoustic resonance spectrum information specific to selected body parts of known individuals, for comparison against newly captured acoustic resonance spectral information obtained from an identification subject and for determination whether said subject's acoustic spectra matches that of a data base participant.

13 Claims, 5 Drawing Sheets

Schematic illustration of the apparatus of the invention.

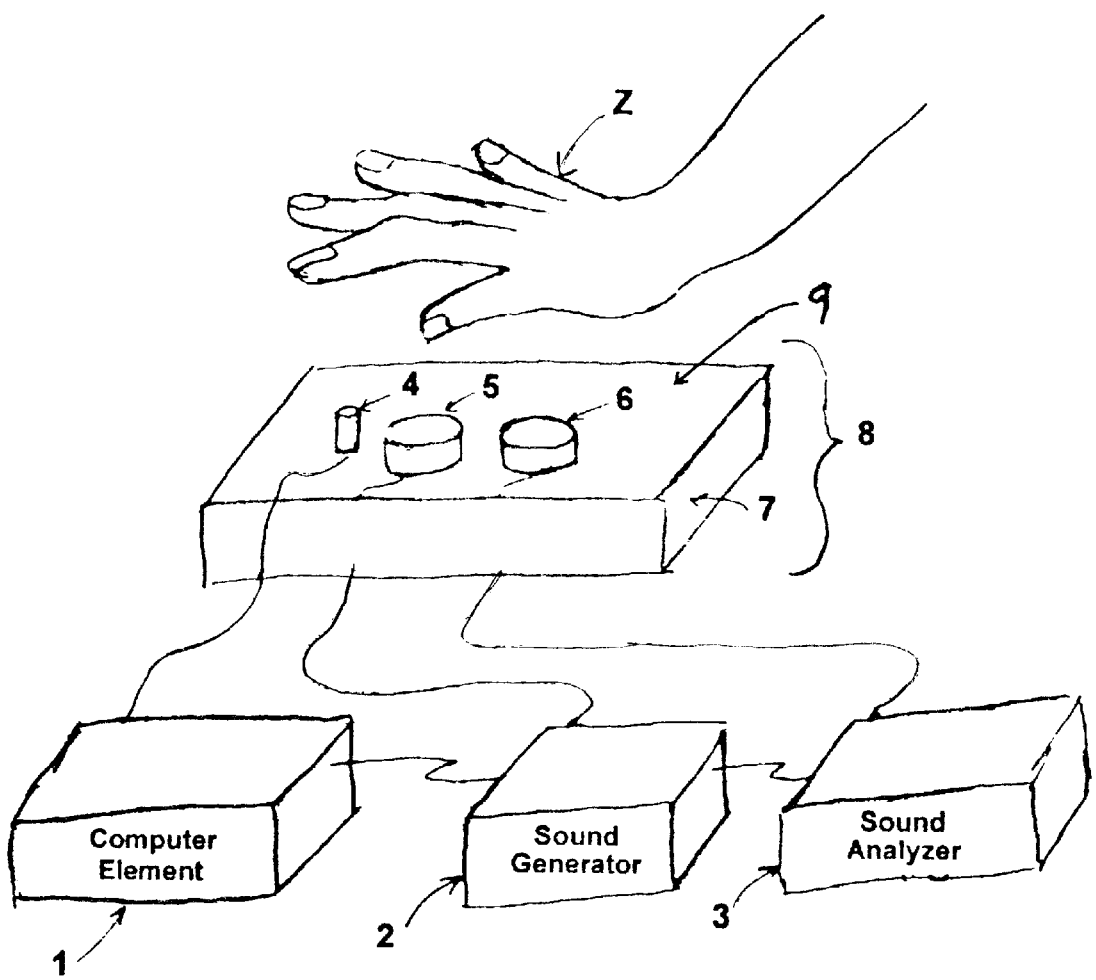
FIG. 1. Schematic illustration of the apparatus of the invention.

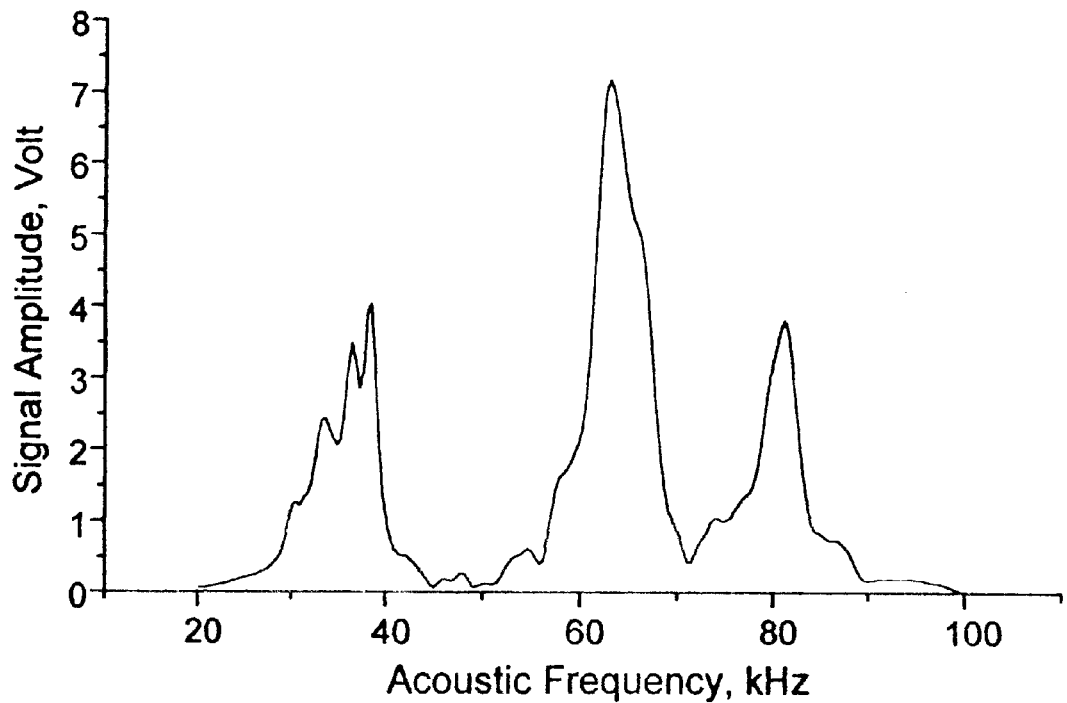
FIG. 2. Acoustic spectrum of "John Doe"'s left hand.
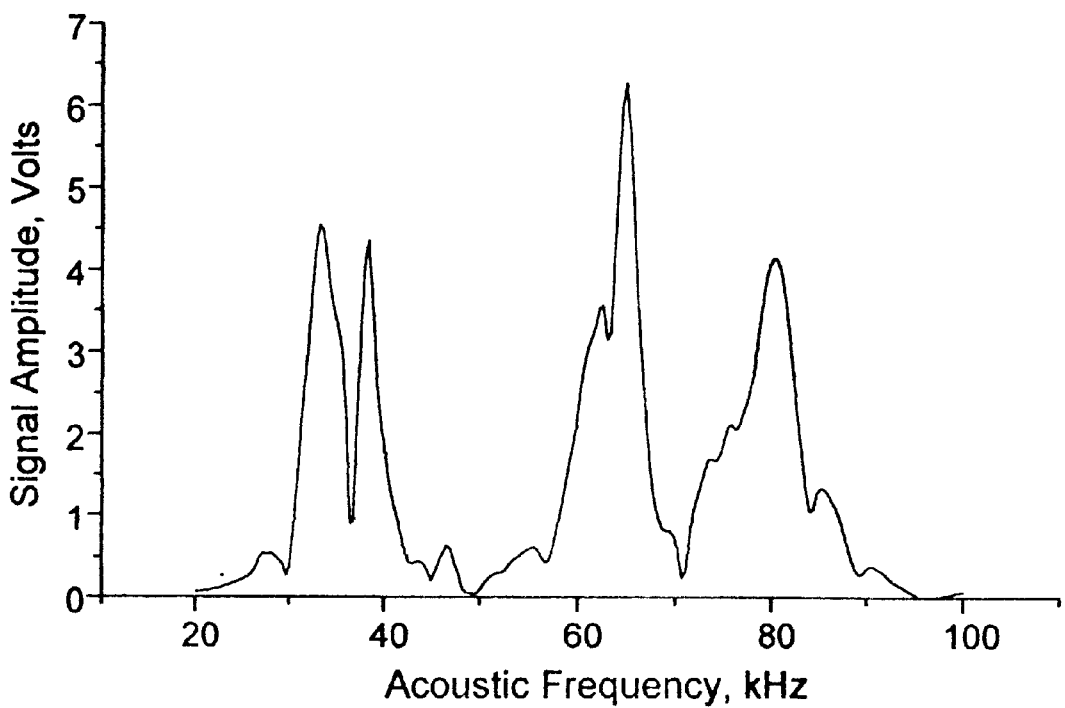
FIG. 3. Acoustic spectrum of John Doe's right Hand.

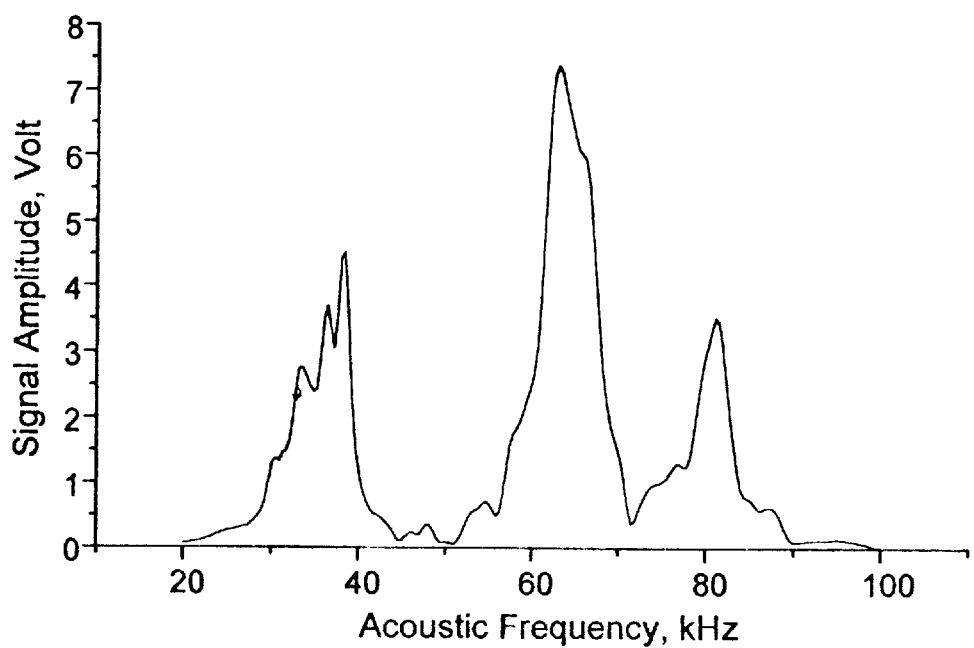
FIG. 4. Acoustic spectrum of a second measurement of John Doe's left hand.
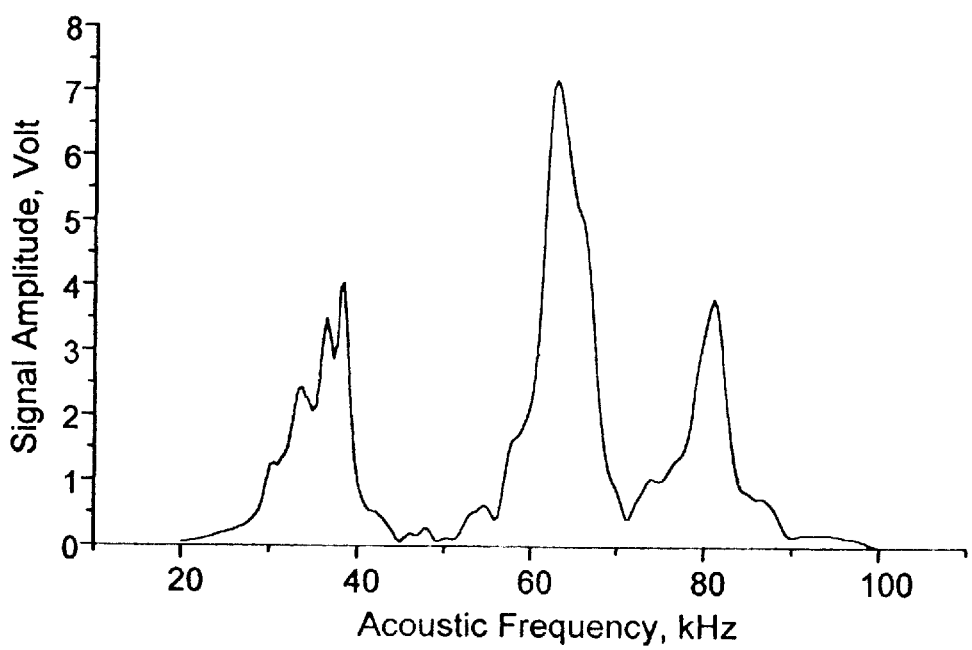
FIG. 5. Acoustic spectrum of a third measurement of John Doe's left hand.

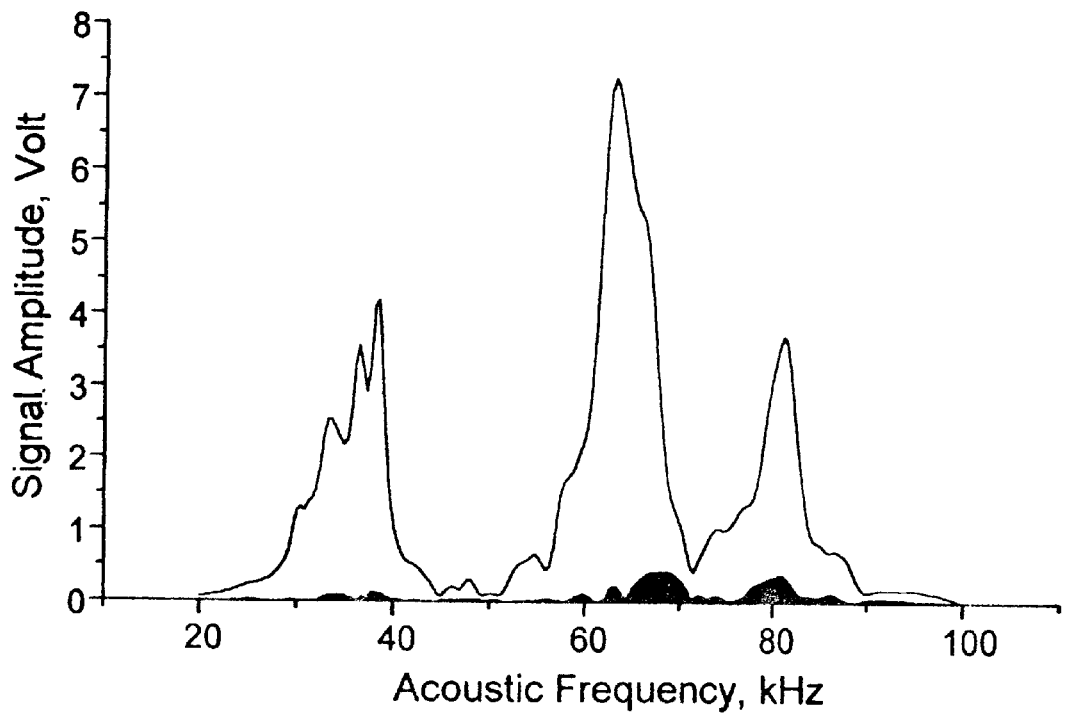
FIG. 6. Baseline spectrum of John Doe's Left Hand.
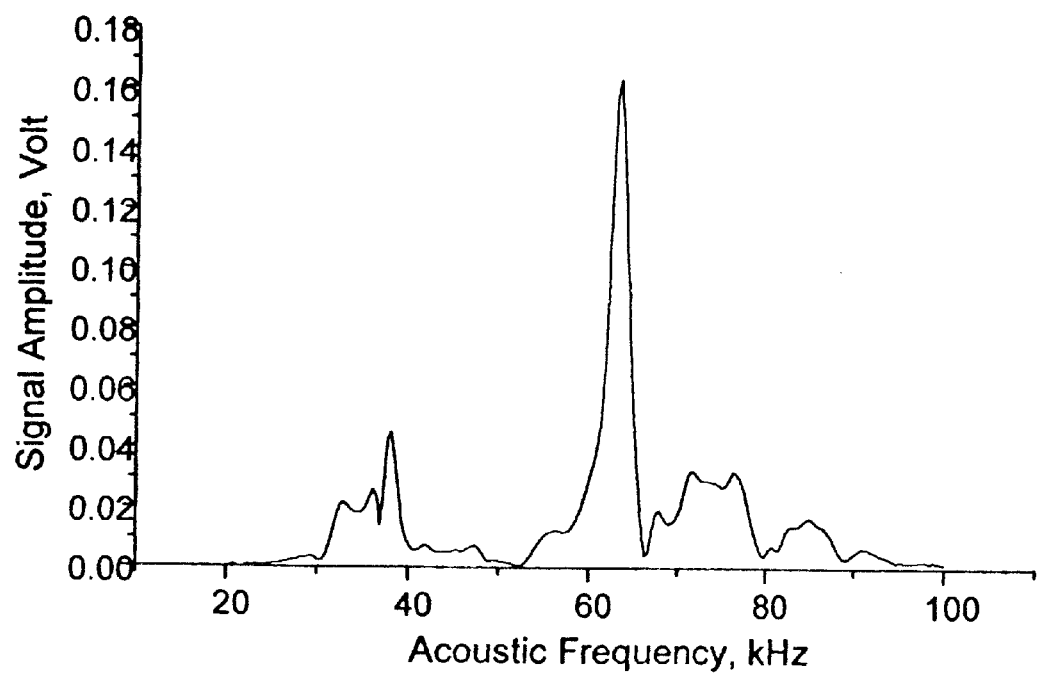
FIG. 7. "Measured spectrum" of one of "Jane Doe"'s hands.

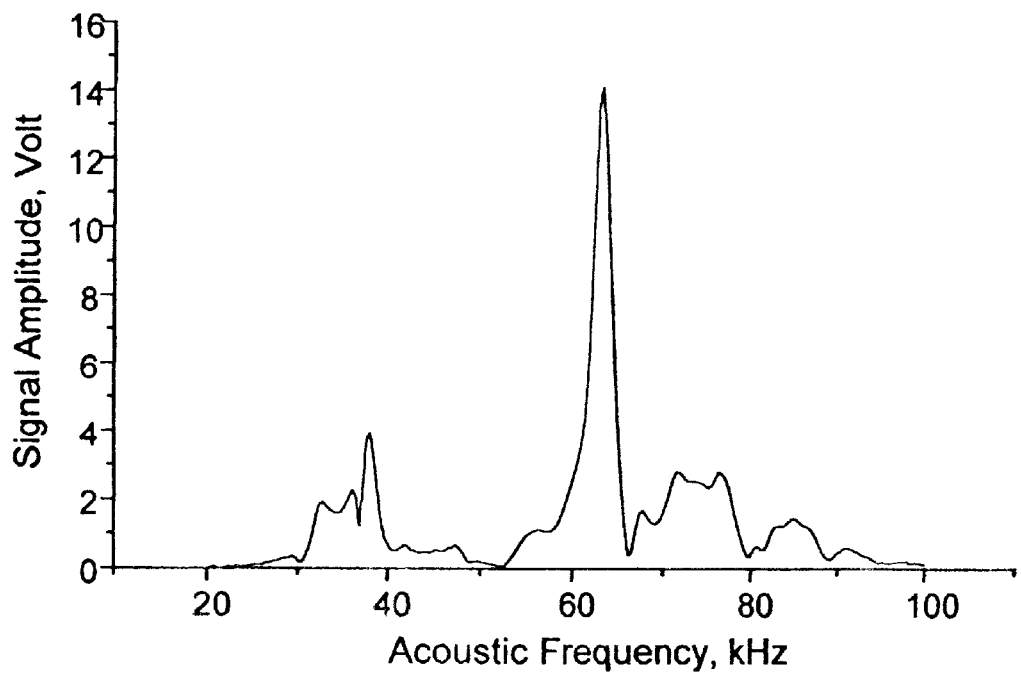
FIG. 8 is an illustrative normalized spectrum of Jane Doe's hand.
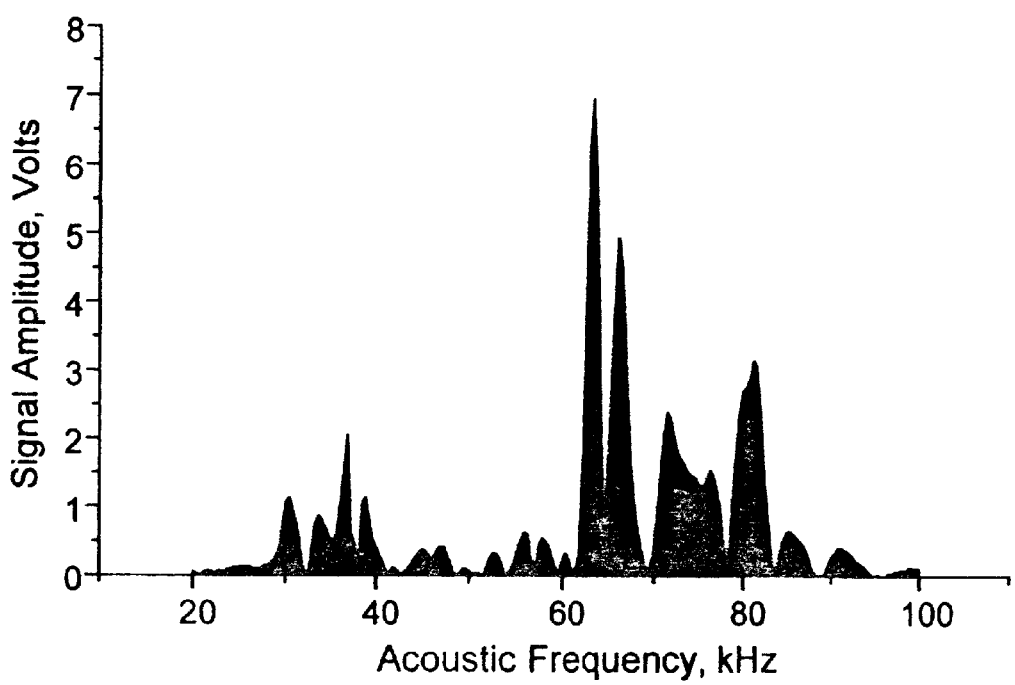
FIG. 9. The "difference spectrum" between Jane Doe and John

PERSONAL IDENTIFICATION METHOD AND APPARATUS USING ACOUSTIC RESONANCE ANALYSIS OF BODY PARTS

TECHNICAL FIELD

The present invention relates to biometric personal identification systems, and more particularly, to a biometric personal identification system that employs acoustic energy means for capturing the unique acoustic resonance spectrum of a selected body part, such as a person's hand, storing this spectral information in an electronic database, and subsequently making a comparison of the stored spectral data with currently detected data for identification and recognition purposes.

BACKGROUND ART

Biometric personal identification systems have been in existence for many years and are used in many different applications. A particular field of application concerns control of access to secured locations, such as gated residential complexes, sports and entertainment facilities, aircraft and the like. Related applications include personal identifications for cash and credit transactions, and for computer access.

A particular advantage of biometric identification systems is that such systems rely on physical characteristics that are unique to each individual and thus cannot readily be stolen, copied or otherwise faked. Accordingly many biometric identification systems have been devised, including a number of systems that involve measurements of body parts or of characteristics of body parts, such as hand measurements. For example U.S. Pat. No. 5,793,881 granted to Stiver et al, Aug. 11, 1998, discloses a personal identification system using infrared scanning of the hand, and it lists a number of prior art patents that also employ measurements of the hand or other body parts, including:

U.S. Pat. No. 3,648,240 granted to Jacoby et al, Mar. 7, 1972, which electronically gauges predetermined dimensions of a human hand.

U.S. Pat. No. 4,699,149 granted to Rice, Oct. 13, 1987, discloses identification means using subcutaneous blood vessels utilizing infrared or thermal radiation.

U.S. Pat. No. 4,785,171 granted to Dowling Jr., et al, Nov. 15, 1988, utilizing light transmitted through fiber optics to determine fingerprint characteristics.

U.S. Pat. No. 4,857,916 granted to Bellin Aug. 15, 1989, discloses an identification system utilizing characteristics of a person's grasp to identify an individual.

U.S. Pat. No. 4,932,776 granted to Dowling Jr., et al, Jun. 12, 1990, wherein a high intensity light is transmitted through a finger or the like and the image is projected via a bundle of fiber optics.

U.S. Pat. No. 4,946,276 granted to Chilcott, Aug. 7, 1990, utilizes an optical encoder and by rotating the finger allows a fingernail-to-fingernail scan of the subject's finger for identification purposes.

U.S. Pat. No. 5,088,817 granted to Igaki, et al, Feb. 18, 1992, utilizing the differential in the color of the skin when the finger or other object is pressed against a lens.

U.S. Pat. No. 5,230,025 granted to Fishbine, et al, Jul. 20, 1993, discloses a method for recording fingerprint data of a finger rolled across a planar surface.

U.S. Pat. No. 5,335,288, granted to Faulkner Aug. 2, 1994, discloses a biometric measuring apparatus for recognizing a person's identity based on measurements performed upon a person's hand.

U.S. Pat. No. 5,351,303 granted to Willmore Sep. 27, 1994, senses and compares a unique infrared image pattern from an individual finger with the pattern of the same finger within memory components of the system.

In terms of simplicity, low cost and ease of use, none of these known prior art identification systems is believed to match the advantages of the present invention, which relies on capturing the unique acoustic resonance spectrum associated with the human hand (or other selected body part).

With the above-known prior art in mind, it is accordingly a principal object of the present invention to provide a unique method of individual identification that comprises means for capturing the acoustic spectrum associated with a selected human body part such as the hand.

It is another object of the invention to provide an identification system whereby acoustic spectrum information associated with known subjects may be stored in an electronic data base, and means are provided whereby comparable acoustic spectra information of persons seeking to have their identity authenticated may be mapped and compared against said data base and the presence or absence of a match thereby determined.

It is yet another object of the present invention to provide a biometric personal identification system that may readily be coupled to controlled access means whereby authentication of a person using the personal identification system automatically enables entry to premises or resources subject to said controlled access means.

Another object of the present invention is to provide a reliable biometric personal identification system that is inexpensive, readily portable and simple to operate.

It is a principal objective of the invention to provide a personal identification and recognition system that is safe, convenient, inexpensive, fast (a few seconds or less) and that provides a useful degree of discrimination. Potential applications include, but are not restricted to, authorizing entry of people into commercial buildings, gated communities, apartment complexes, hotel rooms, personal automobiles, authorizing access to personal computers, bank accounts, etc.

BRIEF SUMMARY OF THE INVENTION

The invention comprises means for capturing a unique acoustic resonance spectrum of a person's head, hands, feet, fingers, toes, or other appropriate parts of the body, and thereafter using the captured spectral information for identification purposes. The invention thus comprises means for extracting selected information from each unique captured spectrum and for storing said spectral information on a digital storage medium, thereby forming a database library of spectra covering a plurality of individual participants in the recognition process. The invention further comprises comparison means for mapping and comparing the spectral information collected from an unknown sample against the spectra stored in said library, and decision means for deciding, within a certain degree of confidence, whether or not a sample spectrum being analyzed is that of an individual having a spectrum stored in the library.

DESCRIPTION OF DRAWINGS

FIG. 1 is a schematic illustration of an apparatus according to the invention.

FIG. 2 is an illustrative acoustic spectrum of "John Doe"'s left hand.

FIG. 3 is an illustrative acoustic spectrum of John Doe's right Hand.

FIG. 4 is an illustrative acoustic spectrum representing a second measurement of John Doe's left hand.

FIG. 5 is an illustrative acoustic spectrum representing a third measurement of John Doe's left hand.

FIG. 6 is an illustrative baseline spectrum of John Doe's Left Hand.

FIG. 7 is an illustrative "measured spectrum" of one of "Jane Doe"'s hands.

FIG. 8 is an illustrative normalized spectrum of Jane Doe's hand.

FIG. 9 is an illustration of the "difference spectrum" between Jane Doe and John Doe.

DETAILED DESCRIPTION OF A PREFERRED EMBODIMENT OF THE INVENTION

An embodiment of the biometric identification system of the invention is shown schematically in FIG. 1, in this instance employing a hand identification mode. As shown in FIG. 1 the system comprises computer element 1 (which could consist simply of a smart computer chip) that is coupled electronically to acoustic sound wave generator 2 (for example, such as is currently marketed by Dynamic Resonance Systems (DRS), Inc.), to acoustic sound analyzer 3 (for example, such as is also marketed by DRS, Inc.), and to sensor assembly 8. Sensor assembly 8 comprises an acoustic absorber 7 having a surface 9 on which are positioned switch 4, transmitting transducer 5, and receiving transducer 6.

Placement of an object (here a subject's hand, Z) in firm contact against surface 9 depresses and thereby triggers switch 4, causing said switch to transmit to computer element 1 a signal commanding said computer element to actuate sound wave generator 2. Sound wave generator 2 thereupon sends to transmitting transducer 5, on surface 9 of sensor assembly 8, an analog electrical signal representative of a desired acoustic waveform, and transducer 5 in response to said signal emits sound waves having the desired wave form that are transmitted to, and into, the object (here, hand Z) pressed against sensor assembly 8.

Receiving transducer 6, also located on surface 9 of sensor assembly 8 a short distance from transmitting transducer 5, is positioned to detect sound wave energy emitted by transmitting transducer 5 and transmitted through hand Z (or other object placed on surface 9 of sensor assembly 8); at the same time, acoustic absorber 7 serves to limit direct sound transmission (cross talk) between transmitting transducers 5 and receiving transducer 6. Receiving transducer 6 transmits to sound analyzer 3 an electrical analog signal representative of the sound wave energy transmitted through hand Z. Sound analyzer 3 processes said analog signal and transmits to computer element 1 a signal representative of the frequencies and amplitude[s] of the received sound wave energy.

For most embodiments of the invention it is recommended that the invention comprise a positioning system (not shown) adapted to urge an individual's hand (or other body part) to always be located in substantially the same position relative to the sensor assembly 8, and which preferably either monitors the pressure of the hand on the transducers or applies a specified pressure to the hand over the transducers.

The invention is not confined to the flat sensor assembly 8 configuration shown in FIG. 1. Indeed the transducer-acoustic-absorber assembly could be incorporated within the curved form of a computer mouse or of a door handle, for example, for finger or hand identification, or within a headband or headrest for head identification.

It will readily be appreciated that a plurality of transmitting transducers and/or a plurality of receiving transducers could be incorporated in the sensor assembly to generate and record the sound waves transmitted by different parts of the body (for example, in the case of the hand, there could be a receiving transducer for each finger of the hand).

Similarly, it should be understood that a plurality of sensor assemblies could be connected to a single stand-alone computer-generator-analyzer system, or to a networked computer system comprising the requisite acoustic energy generating means and analyzer means. Such could be the case, for example, in a hotel room application, where the handle of the door to each room could contain a sensor assembly, each such assembly being connected to a central station at a remote site.

A typical acoustic resonance spectrum obtained for the left hand of an individual (who we will call John) with the apparatus described above is shown in FIG. 2, for the frequency range 20 to 100 kHz. It took approximately 3 seconds to obtain this measurement with the apparatus described above. For comparison, a similar spectrum of John's right hand is shown in FIG. 3, from which it is seen that the spectra of John's two hands are significantly different.

We have discovered that such acoustic resonance spectra have features that are unique to each individual, and that can therefore be used to discriminate between different individuals and to serve as a personal signature for identification purposes. We have observed this phenomenon for acoustic spectra of various other parts of the body, including, but not restricted to, the head, chest, hands, feet, and even individual fingers and toes.

In practice, each individual intended to be part of an identification database according to the invention would have his/her acoustic resonance spectrum recorded as described above and stored in a database. Subsequently, the same or a similar spectral data acquisition system would be used for capturing spectral samples from each identification subject, for comparison against the information stored in the database library.

Determination of a Baseline Signature

To obtain a baseline spectrum for an individual, such as John, the taking of several (typically 3 to 5) separate measurements of the same body part is considered desirable in order to obtain an indication of the reproducibility of that individual's spectra. Thus FIGS. 4 and 5 show two additional, separate measurements of John's left hand spectrum. These spectra are quite consistent with that of FIG. 2, but do reflect some minor differences typical of those that result from slight variations with each measurement in the position and applied pressure of the hand over the transducer assembly.

The combined, baseline hand spectrum for John shown in FIG. 6 is obtained by averaging the data displayed in FIGS. 2, 4 and 5. Statistical analysis of the differences between the individual measurements and the baseline spectrum provide a measure of the "reliability" of the baseline spectrum. The solid region shown in FIG. 6 is the absolute spectral difference between FIG. 4 (of the three, this spectrum has the largest deviation from the baseline average) and the baseline spectrum. Off the shelf software (for example Microcal™ Origin™ marketed by Microcal Software, Inc) readily enables computation of the area under any part of these spectral data. The area of the solid region in FIG. 6 is 6% of the total area under the baseline spectrum. The smaller that area the more reliable is the data used in determining the baseline spectrum, and the better will be the discrimination between different individuals. The information contained in FIG. 6, along with the statistical reliability data, make up John's baseline hand signature. It is stored in a computer database to be used for comparison.

Method for Comparing a Measured Spectrum with a Baseline Signature

FIG. 7 shows the hand spectrum of another individual (who we will call Jane) as measured with the apparatus described in FIG. 1. Notice how the shape of that spectrum is different from John's signature spectrum shown in FIG. 6. The number, frequency, and relative amplitude of the peaks are quite different, and the automated analysis of these differences provide provides a reliable and reproducible basis for discriminating one individual from another.

Using the apparatus shown in FIG. 1, it has been observed that the absolute amplitude of the measured signal can vary significantly from one measurement to another, even for the same individual, principally because of variations in hand pressure over the transducer assembly. The following "normalization" procedure may be employed in order to neutralize this effect: in comparing a measured spectrum such as that in FIG. 7 with a baseline spectrum such as that in FIG. 6, we first scale the amplitude of the measured signal so that the area under the measured spectrum is the same as the area under the baseline spectrum. We call the scaled spectrum, shown in FIG. 8, the "normalized" measured spectrum.

We then make a number of comparisons between Jane's normalized spectrum in FIG. 8 and the baseline spectrum of John shown in FIG. 6. The computational operations needed for these comparisons can all be performed and cataloged with off the shelf software (for example Mirocal™ Origin™ marketed by Microcal Software, Inc). We compare the number of major resonance peaks in each data set and the acoustic frequency at which the peaks occur. We compare the relative amplitudes of the major peaks as well as the width at half amplitude for these resonance peaks. We also subtract the normalized spectrum from the baseline spectrum to obtain the "difference" spectrum shown as the solid region in FIG. 9. Note that, if the normalized and the baseline spectra were identical, the "difference" spectrum would be a flat straight line of zero amplitude, subtending an area of zero magnitude.

Then, if the absolute area for the "difference" spectrum (which would be zero if the normalized and baseline spectra were identical) exceeds a certain preset criteria, or if any of the other comparisons just mentioned exceed certain preset criteria, determined by the statistical "reliability" of the baseline spectrum, and by the confidence level required by the particular application of the invention, we would conclude that the measured spectrum does not belong to the individual whose baseline spectrum we are comparing. And indeed, we would conclude here from our comparison methodology (note how large the area of FIG. 9 is compared to the solid region in FIG. 6) that the example spectrum shown in FIG. 7 definitely does not belong to the same individual whose signature spectrum is shown in FIG. 6. In other words, Jane is not the same person as John!

Using current state-of-the-art technology the invention applies the measurement of acoustic spectral resonance response on various parts of the human body, together with methods of analysis of the measured response, to provide a means for identification of people that is fast, inexpensive and amenable to many applications. The sensitivity of discrimination of the technique is not fully known at this time. While certainly not as sensitive as DNA analysis or finger printing, the system and method of the present invention appear to provide discrimination having an uncertainty in the order of one in a hundred. In addition the invention can be used in concert with other identification techniques to enhance the overall discrimination.

Applications of the Invention Include (but are Not Restricted to) the Following:

The invention can be incorporated into the design of bank ATMs (automated teller machines) to render transactions with credit cards much more secure. That is to say, if ATM's required acoustic identification of one or more fingers, it would render stolen credit cards useless for accessing the account. The acoustic identification signature could be encoded into the card itself, or it could be maintained in the bank's database.

The invention can be incorporated into the design of typical credit card readers to require acoustic identification of one or more fingers. It would thereby render stolen credit cards useless for accessing the account anywhere, whether from a grocery store or a telephone booth. The acoustic identification signature could be encoded into the card itself, or it could be maintained in the credit company's database.

The invention can be incorporated into the design of a door handle to authorize entry of people into commercial buildings, gated communities, apartment complexes, hotel rooms and private automobiles.

The invention can be incorporated into the design of the steering wheel of vehicles to authorize ignition of the vehicle's engine.

The invention can be designed into a hand held wireless device that will identify the holder and authorize remote entry, such as opening a garage door.

The invention can be incorporated into the design of a cell phone or other wireless devices to transmit the identity of the holder of the device.

The invention can be incorporated into the design of hand held weapons such as rifles and pistols to prevent unauthorized use of the weapons.

The invention can be incorporated into the design of jewelry boxes or personal safes to prevent unauthorized access to their contents.

A version of the invention can be designed to allow paid customers to circulate freely in and out of nightclubs, dance halls, sports stadiums and like venues.

The invention can be applied to security problems in aircraft, schools and prisons, and to check attendance in classes, cafeterias, sports events and the like.

A version of the invention could be designed to identify the bare feet of individuals as they step onto the invention device. This would have applications in prisons, hospitals, rest homes, swimming pools, etc.

The invention can be used in concert with other identification devices to greatly enhance overall discrimination. There exist devices that visually identify the hands of individual. These devices could be modified to incorporate the invention thereby compounding the discrimination capability of each device.

A version of the invention could have the form of a tight grid of "nails", each of which is an acoustic transducer. As you place a hand on the nails, the nails depress thereby recording information about the shape of the hand in addition to the acoustic information.

The invention could be used in concert with a voice identification system to produce a more discriminating system.

The invention could be used, not as a security measure, but as a convenience in the home or office to perform certain functions. For example, a family member or a staff member could automatically adjust lighting and air-conditioning levels in the home or office to his or her preset values by placing a hand over a version of the invention designed specifically to control these functions.

The invention could be used for checking the content or integrity of objects in a commercial application. For example, packages on a merchandise conveyor belt, that should all be identical, could be monitored automatically with a version of the invention to determine if indeed each package contains the expected components.

In addition the invention can be incorporated into the design of a computer mouse to authorize the use of a computer or to enable special functions of a computer, such as providing identification information for financial transactions on the internet.

Such an application could be implemented by including two or more transducers into the design of the mouse at positions where they would be in contact with the hand holding the mouse. The sound wave generator and analyser needed to interact with the transducers could be incorporated in this application by integrating the required electronic circuitry into the "sound" card that is found in all modern personal computers that have audio capabilities. The necessary electrical wiring from the modified sound card to the transducers could be added to the cord connecting the mouse to the computer. Finally, control of the transducers could be provided via a graphical software interface stored on the computer.

What is claimed is:

1. An acoustic spectra personal identification system, comprising:
   (a) transducer means including at least one acoustic wave emitting means and at least one acoustic wave detecting means positioned spaced apart whereby a selected body part may be placed upon said transducer means, bridging and in simultaneous contact with said at least one emitting means and with said at least one detector means;
   (b) means for monitoring the pressure applied by a said selected body part upon said transducer means;
   (c) acoustic wave generator means adapted to transmit a selected acoustic wave form signal, encompassing a plurality of frequencies within a 20–100 kHz frequency range, to said at least one acoustic wave emitting means;
   (d) acoustic wave analyzer means adapted for converting acoustic wave signals received from said detecting means into digital acoustic spectra signals representing the acoustic spectrum of said received acoustic wave signals;
   (e) recording means for storing digitized acoustic spectra signals; and
   (f) acoustic spectra comparison means.

2. An acoustic spectra product identification apparatus, comprising:
   (a) transducer means including at least one acoustic wave emitting means and at least one acoustic wave detecting means positioned spaced apart whereby a selected product part may be placed upon said transducer means, bridging and in simultaneous contact with said at least one emitting means and with said at least one detector means;
   (b) means for applying a constant pressure to a said selected product part upon said transducer means;
   (c) acoustic wave generator means adapted to transmit a selected acoustic wave form signal to said at least one acoustic wave emitting means;
   (d) acoustic wave analyzer means adapted for converting acoustic wave signals received from said detecting means into digital acoustic spectra signals representing the acoustic spectrum of said received acoustic wave signals;
   (e) recording means for storing digitized acoustic spectra signals; and
   (f) acoustic spectra comparison means.

3. The invention of claim 1 further comprising body part positioning means, including acoustic absorber means disposed intermediate said acoustic wave emitting means and said acoustic detecting means for damping crosstalk therebetween.

4. The invention of claim 3 wherein said body positioning means forms a hand-contacting surface on a manually-controlled device.

5. The invention of claim 1 wherein said means for monitoring the pressure applied by a said selected body part upon said transducers comprises means for applying a constant pressure to said selected body part over said transducer means.

6. The invention of claim 1 comprising a plurality of acoustic wave emitting means.

7. The invention of claim 1 comprising a plurality of acoustic wave detecting means.

8. The invention of claim 1 wherein a plurality of said transducer means are separately located and are under common control.

9. The invention of claim 8 wherein said plurality of transducer means are connected to a common computer control means via wireless means.

10. The invention of claim 1 wherein said acoustic wave analyzer means comprises means for normalizing a first digitized acoustic spectrum and a second digitized spectrum, by scaling the amplitude of the measured signal in said first spectrum as needed in order to cause the area within said first spectrum to match the area within said second spectrum.

11. The invention of claim 2 wherein said acoustic wave generator means is adapted to transmit an acoustic wave form signal comprising a frequency range selected for its suitability in the propagation of sound waves through a selected product.

12. The invention of claim 4 wherein said manually-controlled device is a computer cursor pointing device.

13. The invention of claim 4 wherein said manually-controlled device is a door handle linked to an electronically-controlled lock.

* * * * *

UNITED STATES PATENT AND TRADEMARK OFFICE
CERTIFICATE OF CORRECTION

PATENT NO. : 6,724,689 B2
DATED : April 20, 2004
INVENTOR(S) : Phillip Koenig

It is certified that error appears in the above-identified patent and that said Letters Patent is hereby corrected as shown below:

<u>Title page,</u>
Item [75], should read -- Daniel R. Koenig, Santa Fe, New Mexico
Albert Migliori, Santa Fe, New Mexico, and
Patrick Feehan, Pacific Grove, CA --

Signed and Sealed this

Twenty-second Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,724,689 B2
DATED : April 20, 2004
INVENTOR(S) : Koenig

It is certified that error appears in the above-identified patent and that said Letters Patent is hereby corrected as shown below:

<u>Title page,</u>
Item [74], *Attorney, Agent, or Firm*, should read -- Philip Koenig --.

Signed and Sealed this

Twenty-third Day of May, 2006

JON W. DUDAS
*Director of the United States Patent and Trademark Office*